(12) United States Patent
Gelinotte et al.

(10) Patent No.: US 11,714,976 B2
(45) Date of Patent: Aug. 1, 2023

(54) ANTENNA SWITCHING

(71) Applicant: ANGEL GROUP CO., LTD., Shiga (JP)

(72) Inventors: Emmanuel Gelinotte, Las Vegas, NV (US); Jonathan Souillot, Las Vegas, NV (US); Bernard Molina, Las Vegas, NV (US)

(73) Assignee: ANGEL GROUP CO., LTD., Shiga (JP)

( * ) Notice: Subject to any disclaimer, the term of this patent is extended or adjusted under 35 U.S.C. 154(b) by 0 days.

(21) Appl. No.: 17/051,864

(22) PCT Filed: May 1, 2018

(86) PCT No.: PCT/US2018/030438
§ 371 (c)(1),
(2) Date: Oct. 30, 2020

(87) PCT Pub. No.: WO2019/212534
PCT Pub. Date: Nov. 7, 2019

(65) Prior Publication Data
US 2021/0365648 A1 Nov. 25, 2021

(51) Int. Cl.
 *G06K 7/10* (2006.01)
 *H01Q 1/22* (2006.01)
 *H01Q 7/00* (2006.01)

(52) U.S. Cl.
 CPC ....... *G06K 7/10366* (2013.01); *H01Q 1/2208* (2013.01); *H01Q 7/00* (2013.01)

(58) Field of Classification Search
 CPC .................................................. G06K 7/10366
 See application file for complete search history.

(56) References Cited

U.S. PATENT DOCUMENTS

| | | | |
|---|---|---|---|
| 2003/0176209 A1 | 9/2003 | Soltys et al. | |
| 2007/0105618 A1* | 5/2007 | Steil | G07F 17/32 463/25 |
| 2007/0167134 A1 | 7/2007 | Vuza | |
| 2007/0194931 A1 | 8/2007 | Miller et al. | |
| 2007/0236326 A1 | 10/2007 | Kinoshita | |

(Continued)

FOREIGN PATENT DOCUMENTS

| | | |
|---|---|---|
| JP | 2007257570 A | 10/2007 |
| JP | 2008234265 A | 10/2008 |

(Continued)

OTHER PUBLICATIONS

International Search Report dated Jul. 13, 2018 issued in PCT Application PCT/US2018/030438.

(Continued)

*Primary Examiner* — Rafferty D Kelly
(74) *Attorney, Agent, or Firm* — Norton Rose Fulbright US LLP (57) ABSTRACT

A switching device can provide a pass-through connection between a first set of reader inputs and antenna inputs. The switching device can disconnect the pass-through connection between the first set of reader inputs from a first reader and the plurality of antenna inputs. The switching device can generate a tuned signal based on the antenna inputs. The switching device can provide the tuned signal to a second set of reader inputs for a second reader.

13 Claims, 7 Drawing Sheets

(56) References Cited

U.S. PATENT DOCUMENTS

| | | | |
|---|---|---|---|
| 2008/0139118 A1* | 6/2008 | Sanguinetti | H04B 1/0053 |
| | | | 455/41.2 |
| 2008/0234052 A1 | 9/2008 | Steil | |
| 2009/0054130 A1 | 2/2009 | Gelinotte et al. | |
| 2009/0221364 A1 | 9/2009 | Richard et al. | |
| 2010/0210355 A1 | 8/2010 | Koyama et al. | |
| 2011/0204565 A1 | 8/2011 | Gelinotte et al. | |
| 2013/0137501 A1 | 5/2013 | Jones | |
| 2015/0180546 A1* | 6/2015 | Dhayni | H04B 5/0062 |
| | | | 455/41.1 |
| 2017/0074966 A1 | 3/2017 | Pirc et al. | |

FOREIGN PATENT DOCUMENTS

| | | |
|---|---|---|
| JP | 2009267774 A | 11/2009 |
| JP | 2010187807 A | 9/2010 |
| JP | 2013167927 A | 8/2013 |

OTHER PUBLICATIONS

Floerkemeir et al, on-line publication, Smart Playing Cards-Enhancing the Gaming Experience with RFID, Processing of the third international workshop on pervasive gaming applications—PerGames 2006, <URL: https://pdfs.semanticscholar.org/0a58/64143c3a2ecfa4ee90d76638cfef91fdfaa9.pdf>; Published in 2006, (retrieved on Jun. 28, 2019).

Atsushi Watanabe, The Latest Technology of RFID in the ISO Standard, The Institute of Electronics, Information and Communication Engineers, IEICE Technical Report, SIS2007-50 (Dec. 2007), vol. 107 No. 373, Published on Dec. 3, 2007.

Japanese Office Action dated May 24, 2022 issued for JP Application No. 2020-557250.

* cited by examiner

CHIP INVENTORY

+ - HDE PDVE

CHIP COUNT: 80
CHIP SET: MAIN CASH/USD $5,525
ALL CHIPS VALID

| Validator | Transfers | Chip Hound Chips | Chip Hound Setup | Counting | Chip Sets | Chip Connections |
|---|---|---|---|---|---|---|
| ☐ US DOLLAR(USD) | | | COUNT = 80 | SUM: $5,525 | | |
| ☐ MAIN CASH | | | COUNT = 80 | SUM: $5,525 | | |
| ⊞ $25 | | | COUNT = 33 | SUM: $926 | | |
| ⊞ $100 | | | COUNT = 47 | SUM: $4,700 | | |

Reader Status:  Reader A – Connected   Reader B – Connected

ANTENNA SWITCHING

CROSS-REFERENCE TO RELATED APPLICATIONS

This application is a national phase application under 35 U.S.C. § 371 of International Application No. PCT/US2018/030438 filed May 1, 2018, the entire contents of which is specifically incorporated by reference herein without disclaimer.

BACKGROUND

The casino industry has widely adopted radio-frequency identification technology (RFID) to manage inventory and authenticate currency products and other assets. RFID can provide a solutions to live gaming operators by identifying and automatically counting currency transactions, typically using casino chips and plaques. RFID can also facilitate automating bet recognition. However, like any other technology, RFID has evolved and will continue to evolve over time. For casino operators, investments in new technology often involves a strong commitment for many years.

Casino operators may be hesitant to embrace new technology when the new technology causes their existing technology to be obsolete. Science and continuous engineering developments bring new solutions regularly, with new technology always being more advanced than previous technology. Like any other market, the gaming industry faces problems with product obsolescence. However, casino operators are more willing to adopt new technology when they are able to slowly phase out existing technology over a period of time. It would be beneficial to have a solution that enables deploying new RFID technologies without losing backwards compatibility.

SUMMARY

A system can include an antenna with one or more outputs. The system can include a switching device that includes one or more first reader inputs, one or more second reader inputs, and one or more antenna inputs. The outputs from the antenna can be coupled to the antenna inputs. The switching device can be configured to provide a pass-through connection between the first reader inputs and the antenna inputs. The switching device can be configured to disconnect the pass-through connection between the first reader inputs and the antenna inputs. The switching device can be configured to generate a tuned signal based at least in part on the antenna inputs and provide the tuned signal to the second reader inputs.

A system can include an antenna and a switching device coupled to the antenna. A first reader corresponding to a first RFID technology can be coupled to the switching device. A second reader corresponding to a second RFID technology can be coupled to the switching device. The system can include a computing device that is configured read a set of first RFID enabled gaming chips positioned on the antenna from the first reader. The computing device can be configured to send a command to switch from the first reader to the second reader and read a set of second RFID enabled gaming chips positioned on the antenna via the second reader.

A method can include reading a set of first RFID enabled gaming chips positioned on an antenna from a first reader based at least in part on antenna signal. The method can include sending a command to switch from the first reader to a second reader. The method can also include reading a set of second RFID enabled gaming chips positioned on the antenna from a second reader based at least in part on tuned antenna signal. The tuned antenna signal can correspond to the antenna signal modified by a switching device.

These and other aspects, objects, features, and embodiments will become apparent to a person of ordinary skill in the art upon consideration of the following detailed description of illustrative embodiments exemplifying the best mode as presently perceived.

BRIEF DESCRIPTION OF THE DRAWINGS

For a more complete understanding of the embodiments and the advantages thereof, reference is now made to the following description, in conjunction with the accompanying figures briefly described as follows.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

Investment in technology often involves significant operational and financial impact on casino currency products, other assets, and operations equipment. The operation equipment can include RFID readers, antennas, and associated systems. Due to the fact that RFID has evolved and will continue to evolve over time, it is important to provide casino operators with access to new RFID technologies, while continuing to support the old RFID technologies. However, space on a gaming table can be limited. Placing multiple antennas for multiple RFID technologies at each bet spot is impractical. As an example, assume a casino is equipped with operation equipment including antennas, readers, and RFID casino currency configured to read a specific RFID standard, such as Phase Jitter Modulation (PJM). This operation equipment will not be compatible with another RFID standard such as SMART, a proprietary 13.56 MHz ISO18000-3M3 technology developed and owned by Gaming Partners International Corporation. SMART utilizes its own operation equipment configured to the SMART RFID standard. When two different RFID standards must coexist, the infrastructures must be duplicated. SMART antennas, readers, and casino currency must be purchased, along with separate PJM antennas, readers, and casino currency.

As an example, if PJM technology is switched to SMART in a casino, the new RFID standard operation equipment will not be backwards compatible. The operator will need to spend significant resources to remove previous RFID standard equipment and infrastructure including antennas embedded in many different pieces of furniture throughout the casino including cage counters, casino chip banks, gaming tables, and multiple other spots. There is demand for a solution which will provide a simpler, easier, and cheaper path for casino operators to support and operate old and new RFID standards simultaneously.

To facilitate simultaneous operation of multiple RFID technologies, a switching device can be used to pass-through connections from an antenna tuned for a first technology to a reader configured for that first technology. When a switch command is received, the switching device can disconnect the pass-through connection and provide a tuned signal to a second reader that is configured for a second technology. The switching device can be tuned to alter the signal from the antenna that is tuned for the first technology, such that the altered or tuned signal works with the second technology. By iteratively switching between each technology multiple times per second, the first and second readers can read gaming chips from their respective technology simultaneously in real time. In the following discussion, a general description of the system and its components is provided, followed by a discussion of the operation of the same.

Figure 1:
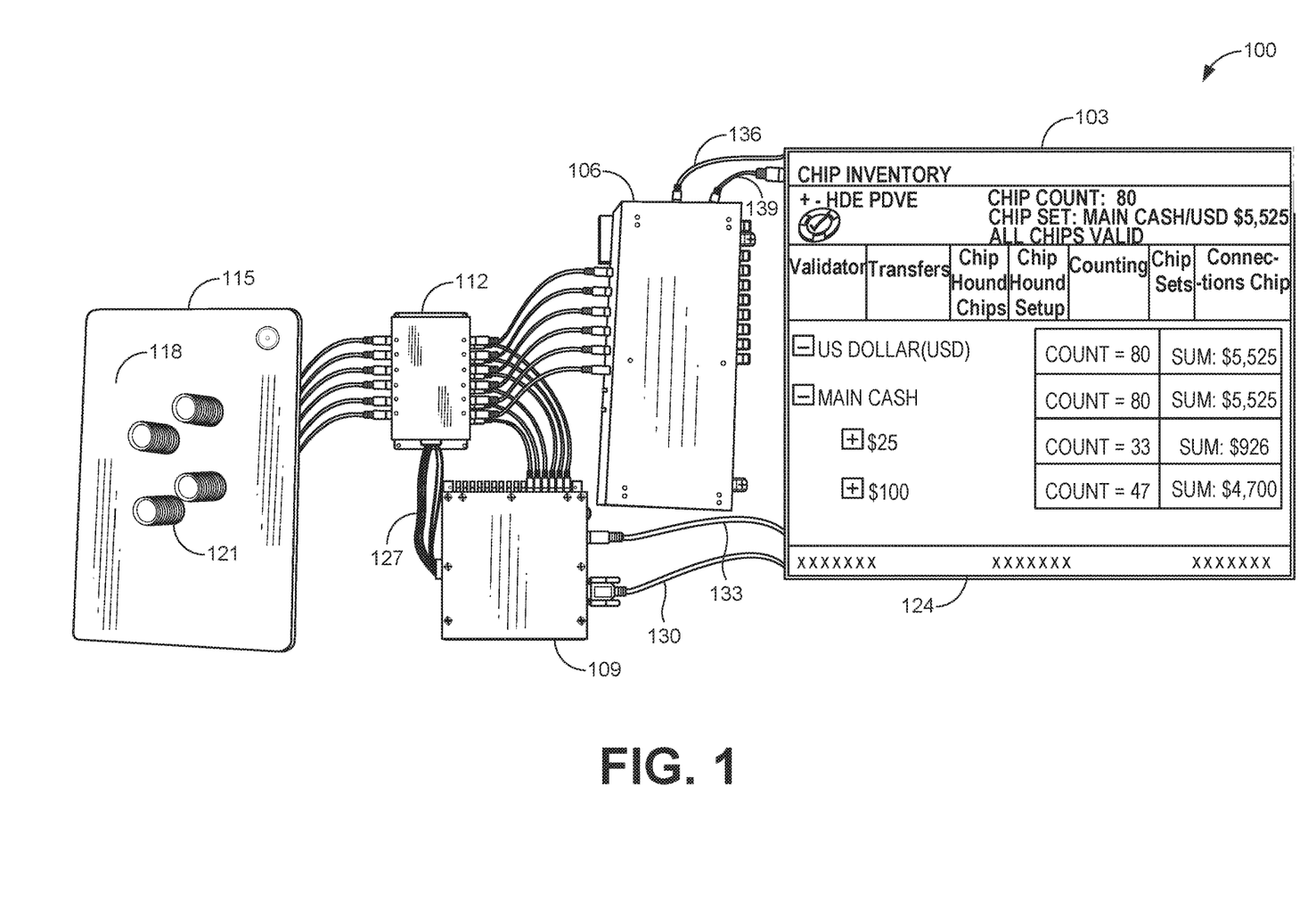
FIG. 1 is an illustration of an example gaming environment according to various example embodiments.

With reference to FIG. 1, shown is a gaming environment 100 according to various embodiments of the present disclosure. The gaming environment 100 can include a computing environment 103 coupled to a reader 106 and a reader 109. The reader 106 and reader 109 can be coupled to a switching device 112. The switching device 112 can be coupled to an antenna device 115. The switching device 112 can receive a power from the reader 106 or 109.

The antenna device 115 can include a surface 118 on which gaming chips 121 can be placed. The term "gaming chip" (or "chip") refers to a physical object which represents cash or other value. The gaming chip can include chips, plaques, jetons, and other value tokens. The antenna device 115 can be used to read gaming chips 121 placed within a reading zone. The reader 106 can be used to read gaming chips 121 corresponding to a first technology, and the reader 109 can be used to read gaming chips 121 corresponding to a second technology. In one embodiment, the first technology can be a 13.56 MHz technology such as a SMART 16 reader 106 using the SMART ISO18000-3M3 standard, while the second technology is one of a phase jitter modulation (PJM) technology, an ISO 15693 technology, or a 125 KHz technology. In other embodiments, different readers correspond to a different one of a 13.56 MHz technology, a PJM technology, an ISO 15693 technology, a 125 KHz technology, or other RFID technology. The switching device 112 can switch between the first technology and the second technology.

The computing environment 103 can render a user interface 124. The user interface 124 can include data describing gaming chips 121 that have been read along with other gaming information. For example, the user interface 124 can indicate a count of gaming chips 121 read along with a sum of the values of the gaming chips 121 read.

Figure 2:
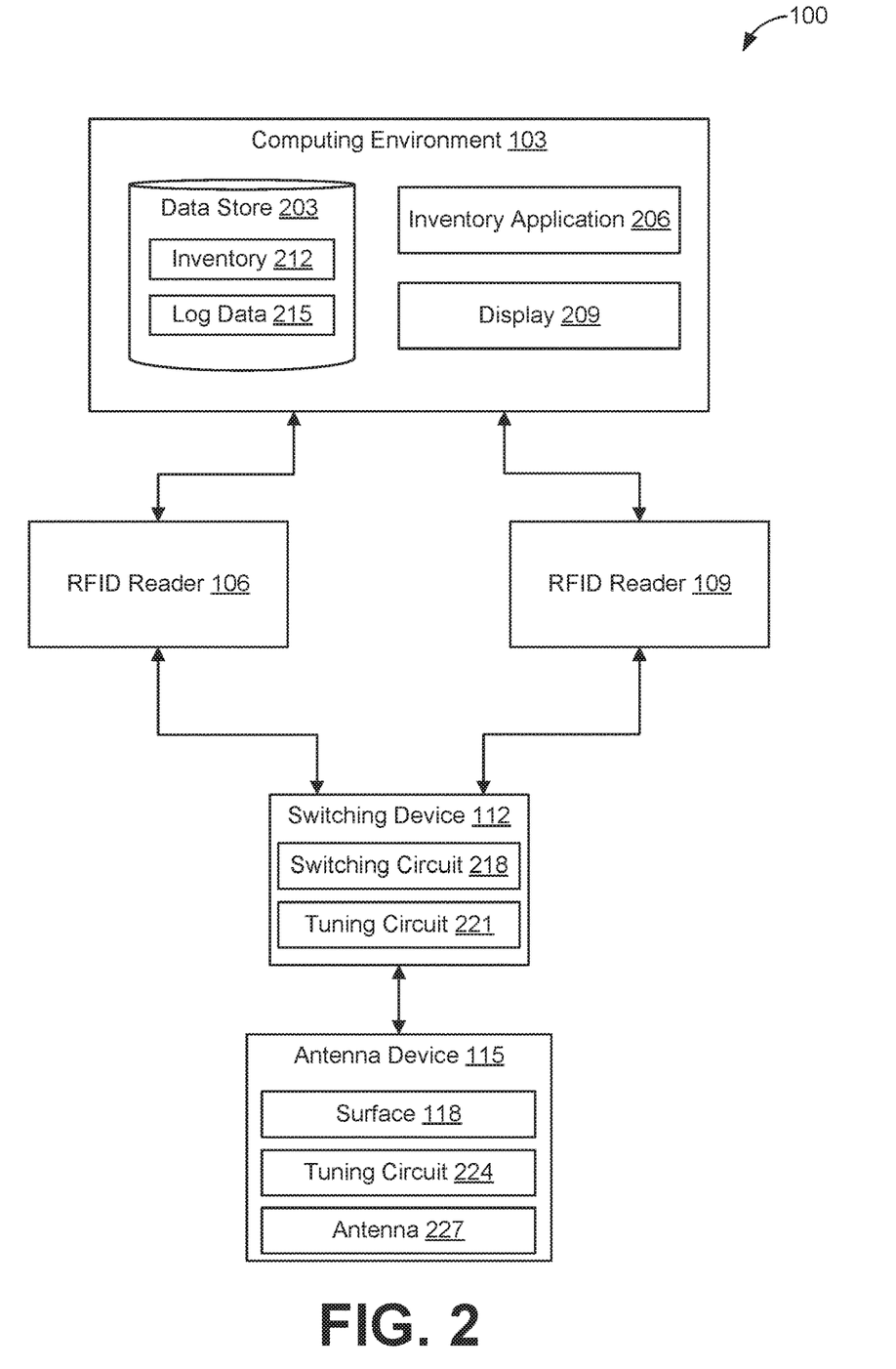
FIG. 2 is an illustration of an example gaming environment according to various example embodiments.

With reference to FIG. 2, shown is an example of a gaming environment 100 according to various embodiments of the present disclosure. The gaming environment 100 can include a computing environment 103, a reader 106, a reader 109, a switching device 112, and an antenna device 115. The computing environment 103 can include a data store 203, an inventory application 206, and a display 209. The switching device 112 can include a switching circuit 218 and a tuning circuit 221. The antenna device 115 can include a surface 118, a tuning circuit 224, and one or more antennas 227.

The computing environment 103 can include, for example, a server computer, desktop computer, laptop, or any other system providing computing capability. The computing environment 103 can employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may correspond to a hosted computing resource, a grid computing resource or any other distributed computing arrangement. In some cases, the computing environment 103 can correspond to an elastic computing resource where the allotted capacity of processing, network, storage, or other computing-related resources may vary over time.

Various applications and/or other functionality may be executed in the computing environment 103 according to various embodiments. Also, various data can be stored in a data store 203 that is accessible to the computing environment 103. The data store 203 may be representative of a plurality of data stores 203 as can be appreciated. The data stored in the data store 203, for example, is associated with the operation of the various applications and/or functional entities described below.

The components executed on the computing environment 103, for example, include an inventory application, and other applications, services, processes, systems, engines, or functionality not discussed in detail herein. The inventory application 206 is executed to continuously monitor inventory on one or more antenna devices 115 deployed in a gaming environment. The inventory application 206 can send an inventory command to the reader 106. The switching device 112 can pass-through the signal from the antenna device 115.

The reader 106 can process the passed-through signal to read the gaming chips 121 (FIG. 1) corresponding to the first technology and send the reading to the inventory application 206. The inventory application 206 can send a switch command to the switching device 112. In some embodiments, the inventory application 206 sends the switch command through the reader 106 or the reader 109.

The switching device 112 can disconnect the pass-through connection and provide a tuned signal to the reader 109. The inventory application 206 can send an inventory command to the reader 109. The reader 109 can process the tuned signal from the switching device 112 to read the gaming chips 121 corresponding to the second technology and send the reading to the inventory application 206. The inventory application 206 can iterate through this process repeatedly.

The inventory application 206 can render a user interface on the display 209 including, for example, a history of inventory of gaming chips 121 identified on the antenna device 115 from one or more RFID technologies. The display 209 can include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. In some embodiments, the display 209 can be positioned such that a pit boss, security personnel, or a dealer at a gaming table can view the display.

The data stored in the data store 203 includes, for example, inventory 212, log data 215, and potentially other data. The inventory 212 can include all gaming chips 121 deployed in a casino. The inventory 212 can also include a history of readings of the deployed gaming chips 121 from one or more antenna devices 115 in the casino. The inventory 212 can include an indication of the technology of each gaming chip 121 read. The inventory 212 can also include a currency value of each gaming chip 121. The inventory 212 can include a location for each reading. As such, the inventory application 206 can track a location of each gaming chip 121 as it moves through a casino. As an example, the inventory 212 can specify that an identifier of a gaming chip 121 was given the John Smith at a casino cage, that John Smith bet the gaming chip 121 on a first table and won, then John Smith bet the gaming chip 121 on a second table and lost, and after losing, that the gaming chip 121 was added to a dealer inventory.

The log data 215 can include information about various events that can occur in a casino. The log data 215 can include a history of inventory audits, a history of equipment failures, and a record of suspicious activity detected. The log data 215 can have a record a cheating event detected in the casino.

The antenna 227 can include a loop, a coil, or some other antenna element. An output of the antenna 227 can be tuned for a specific RFID technology via the tuning circuit 224. As an example, the antenna device 115 can be tuned via the tuning circuit 224 such that the reader 106 can read gaming chips 121 corresponding to a first technology based on signals from the antenna 227. The switching circuit 218 can pass through the signals from the antenna device 115 to the reader 106. The tuning circuit 221 can tune the signal from the antenna device 115 for another RFID technology. As an example, the antenna device 115 can be tuned via tuning circuit 221 such that the reader 109 can read gaming chips 121 corresponding to a second technology.

The tuning circuit 221 can include one or more inputs and one or more outputs. The inputs can be coupled to the antenna device 115, while the outputs are coupled to the reader 109. As an example, one or more wires can be coupled between the reader 106 and the switching device 112. Similarly, one or more wires can be coupled between the reader 109 and switching device 112. The tuning circuit 221 can tune each of the inputs to provide a tuned signal to at the outputs.

The reader 106 or 109 can instruct the switching device 112 to switch between the first technology and the second technology by sending a switching command. In some embodiments, the inventory application 206 can send a switching command to the switching device 112 to switch between technologies. As one example, the switching command can include setting one of the wires coupled between the reader 106 and the switching device 112 to high when using the first technology and setting the wire to low when using the second technology. In another embodiment, a reader 106 can send the switching command as a message to the switching device 112, and the switching circuit 218 can switch between the first technology and the second technology based on the contents of the message.

The switching circuit 218 can provide a pass-through connection between the reader 106 and the antenna device 115 for one or more wires corresponding to the antenna 227. The pass-through connection can be tuned by the tuning circuit 224. The reader 106 can change a line level for a wire indicating which technology or reader to use. The switching circuit 218 can disconnect the pass-through connection between the reader 106 and the antenna device 115 when the line level changes. The switching device 112 can generate a tuned signal based on a signal from the antenna device 115. The switching circuit 218 can provide the tuned signal to the reader 109. As an example, the switching device 112 can tune the signal from the antenna 227 using the tuning circuit 221. The switching circuit 218 can cease providing the antenna signal to the reader 109 and reestablish the pass-through connection. The switching circuit 218 can iterate between providing the pass-through connection to the reader 106 and providing the tuned signal to the reader 109. The switching device 112 can iterate between the readers 106 and 109 when switching commands are received.

The signal from the antenna 227 can be tuned for the first technology by the tuning circuit 224. The tuning circuit 221 can alter the signal tuned output from the tuning circuit 224 for the first technology. In some embodiments, the signal is tuned in the tuning circuit 221 by altering an analog signal from the antenna 227 using passive components. The altered signal output from the tuning circuit 221 is tuned for the second technology and is thus readable by the reader 109.

The tuning circuit 221 and the tuning circuit 224 can be tuned during installation. The tuning circuit 224 can be tuned with respect to the reader 106 and the tuning circuit 221 can be tuned with respect to the reader 109. The tuning circuit 224 can be tuned first and then the tuning circuit 221 can be tuned. Changing the tuning circuit 224 modifies the signal to both the reader 106 and reader 109, while changing tuning circuit 221 modifies only the signal to the reader 109. In some embodiments, the tuning circuit 224 can be adjusted to match a characteristic impedance for the technology of the reader 106. The characteristic impedance for the technology of the reader 106 can differ from the characteristic impedance for the technology of reader 109. The tuning circuit 221 can adjust the characteristic impedance from the tuning circuit 224 to match the technology of the reader 109.

As an example, the switching device 112 can receive a command to configure the tuning circuit 221. In some embodiments, the switching device 112 can enter a configuration mode in response to an input, such as, for example, receiving the command or pressing a button. In other embodiments, the tuning circuit 221 can be tuned manually by adjusting various switches. One or more parameters can be determined to tune the signal from the antenna 227. The parameters can correspond to a value of passive components, such as a capacitance, resistance, or inductance; a timing setting; or some other parameter. For example, a parameter can be determined by a technician setting a resistance value of a variable resistor in the tuning circuit 221. The one or more parameters can be stored in the switching circuit. In an example of a variable resistor, an input of the variable resistor can be turned to adjust the resistance, and the parameter of the resistance can be considered stored according to a position of the input. In some embodiments, a computing device in the switching device 112 can store the parameters in a memory device. The computing device can execute software that processes the incoming signal from the antenna device 115 and outputs a tuned signal to the reader 109.

The switching device 112 can switch between the reader 106 and the reader 109 at a frequency, which can be controlled based on the switching input. According to one example, the reader 106 can raise and lower a line level for the switching input at the frequency. The switching device 112 can alternate between providing the pass-through connection to the reader 106 for a first time window and providing the tuned signal to the reader 109 for a second time window. In some embodiments, the switching device 112 provides the signals to only one reader at a time. The reader 106 can read gaming chips 121 from the first technology that is positioned on the surface 118 of the antenna device 115 during the first time window. Similarly, the reader 109 can read gaming chips 121 from the second technology that is positioned on the surface 118 of the antenna device 115 during the second time window.

Although not shown, one or more additional readers corresponding to different technologies can be coupled in parallel to the switching device 112. As an example, the switching device 112 can include multiple tuning circuits 221 individually corresponding to a different technology. The switching device 112 can switch between the different technologies based on information in the switch command. As an example, a computing device in the switching device 112 can process the switch command to determine which reader to switch to. As another example, multiple line levels can be adjusted to set a binary value corresponding to the different readers. As such, the inventory application 206 can read, via the reader 106, reader 109, and additional readers, intermixed gaming chips 121 from any number of RFID technologies when placed on a single antenna surface 118 in real time. The inventory application 206 can store the read values in inventory 212. The inventory application 206 can detect equipment failures and cheating events and store the occurrence in log data 215.

Figure 3:
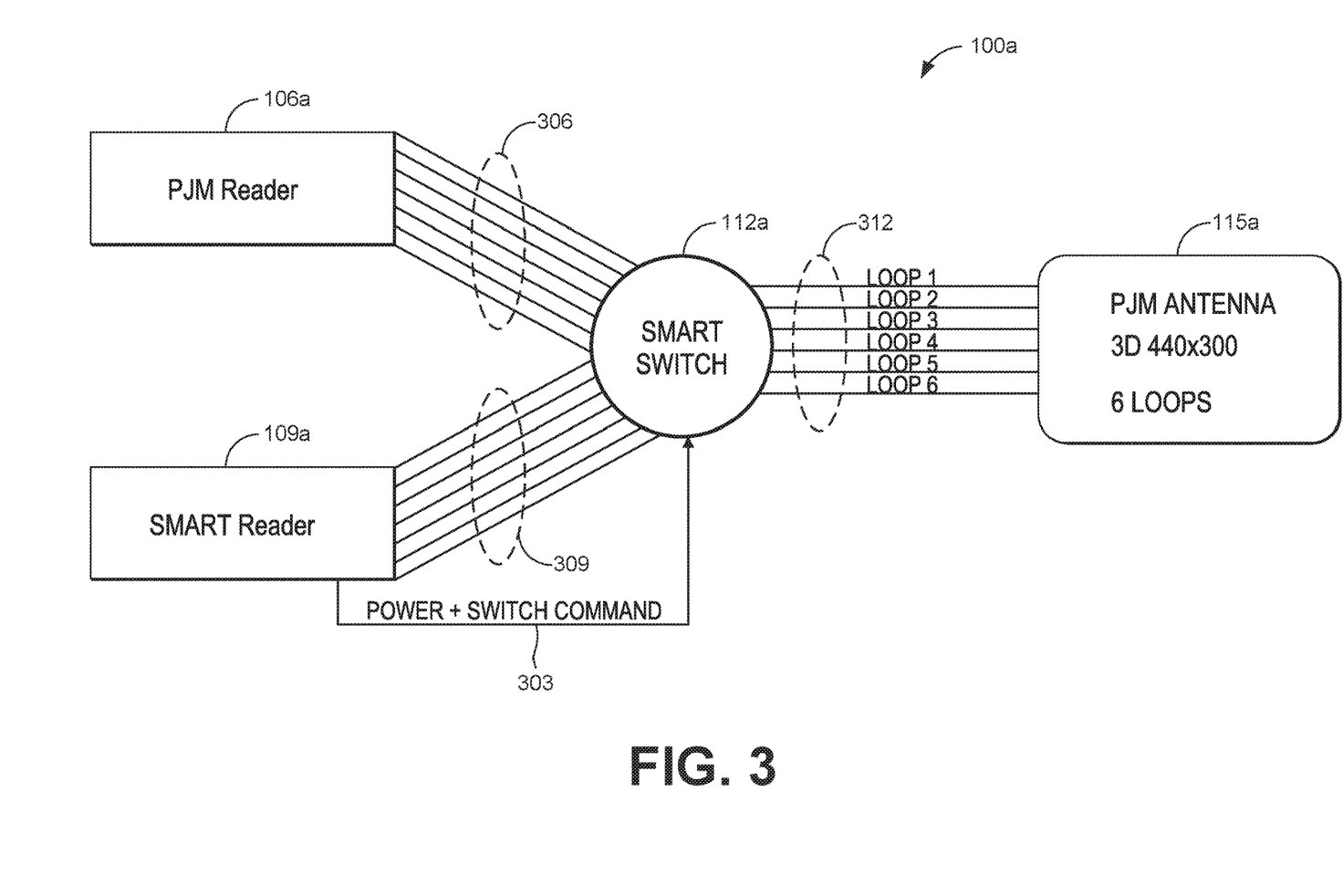
FIG. 3 is an illustration of a portion of an example gaming environment according to various example embodiments.

With reference to FIG. 3, shown is a portion of an example gaming environment 100a according to various embodiments of the present disclosure. The gaming environment 100 can include a reader 106a, a reader 109a, a switching device 112a, an antenna device 115a, and a computing environment 103 (FIG. 1). In this example, the reader 106a can be configured to read PJM gaming chips 121, such as, for example, a MARS 24 reader 106a (FIG. 1). The reader 109a can be configured to read SMART gaming chips 121, which is a proprietary 13.56 MHz technology.

The reader 109a can have a connection 303 and one or more connections 309 with the switching device 112a. The connection 303 can correspond to a USB connection, a network connection, an RS232 connection, an RS485 connection, or another type of connection. The connection 303 can supply power to the switching device 112a. Also, the reader 109a can send a switch command to the switching device 112a via the connection 303.

The antenna device 115a can be tuned for the PJM technology. In one example, the antenna device 115a includes six loops that provide a 3D 440×300 mm sensing area. In some embodiments, a different number of loops can be used. The number of loops can depend on an antenna size and type. For example, a 1D antenna may use one loop, a 3D antenna may use six loops, and another type of antenna may use 24 loops. As such, the switching device 112a can provide a pass-through connection between the antenna device 115a and the reader 106a and provide a tuned signal to the reader 109a. The switching device 112 can tune the signal to read SMART gaming chips 121. The pass-through connection refers to individually coupling a loop of the connection 312 to a respective one of the connections 306. As an example, a first wire of connection 306 can be electrically connected to a first wire of the connection 312, while a second wire of the connection 306 can be electrically connected to a second wire of the connection 312, and so on.

Figure 4:
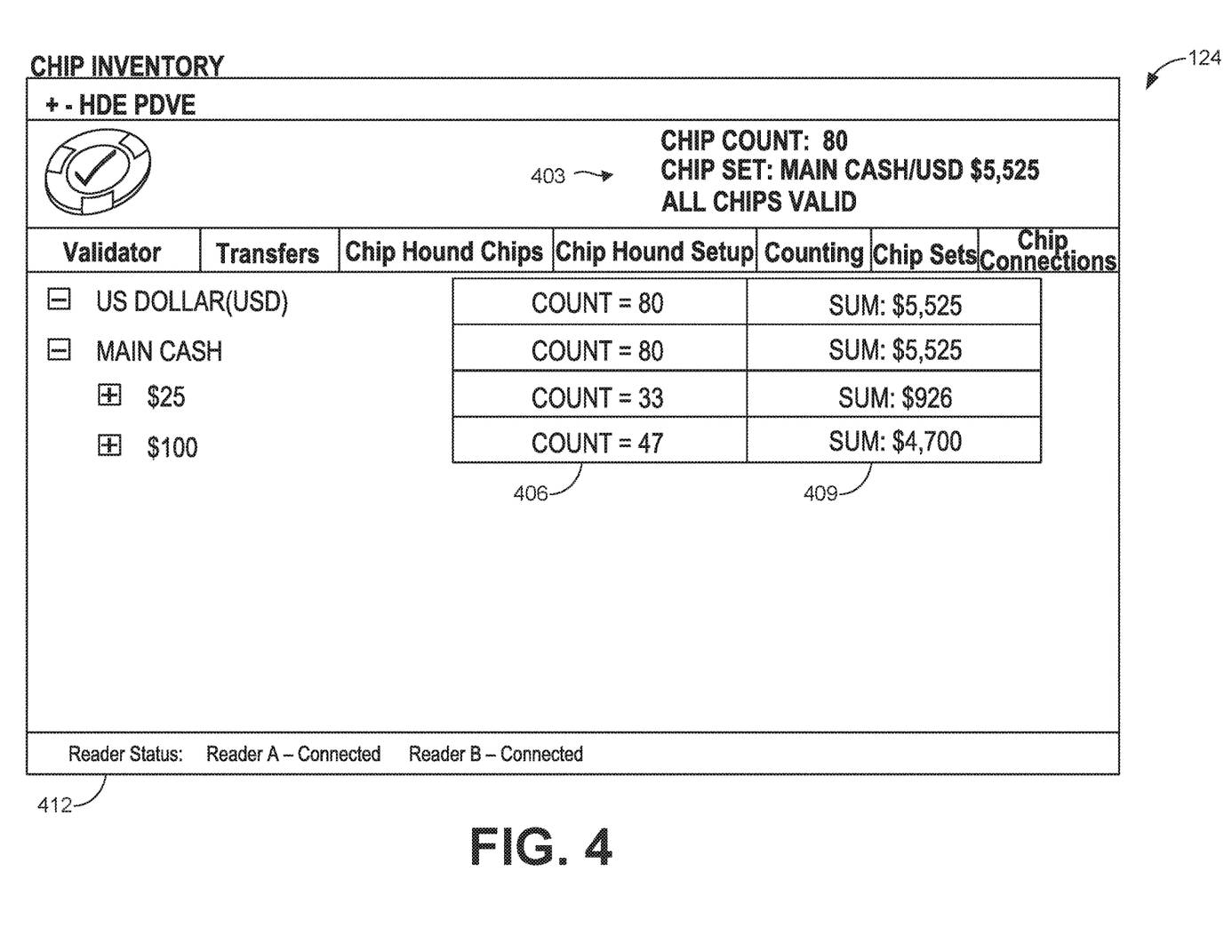
FIG. 4 illustrates a user interface rendered by a computing environment in the gaming environment of FIG. 1 according to various example embodiments.

Turning to FIG. 4, shown is a user interface 124 rendered on a display 209 (FIG. 2) of a computing environment 103 (FIG. 1) according to various embodiments of the present disclosure. The user interface 124 includes current chip information 403, a history of counts 406, and a history of corresponding currency amounts 409, a status indicator 412 for various equipment, and potentially other elements.

The current chip information 403 can include a count and monetary value for all gaming chips 121 on the surface 118 of one or more antenna devices 115 during a most recent read operation. The current chip information 403 can also include an indicator specifying the validity of the gaming chips 121 on the surface 118. As an example, if a stolen gaming chip 121 is detected, the current chip information 403 can indicate the stolen unit.

The history of counts 406 and a history of corresponding currency amounts 409 can specify a count of gaming chips 121 present during a read operation and a sum of all of the monetary values of the counted gaming chips 121. The monetary value can correspond to an amount of a currency paid to obtain the chip. In some embodiments, the monetary value is a pretend unit of value without a connection to real money.

The status indicators 412 can indicate connectivity of the readers 106 and 109, the switching device 112, and other gaming equipment. In some embodiments, the status indicators 412 can include an indication that tuning circuit 221 or 224 needs to be re-tuned.

Figure 5:
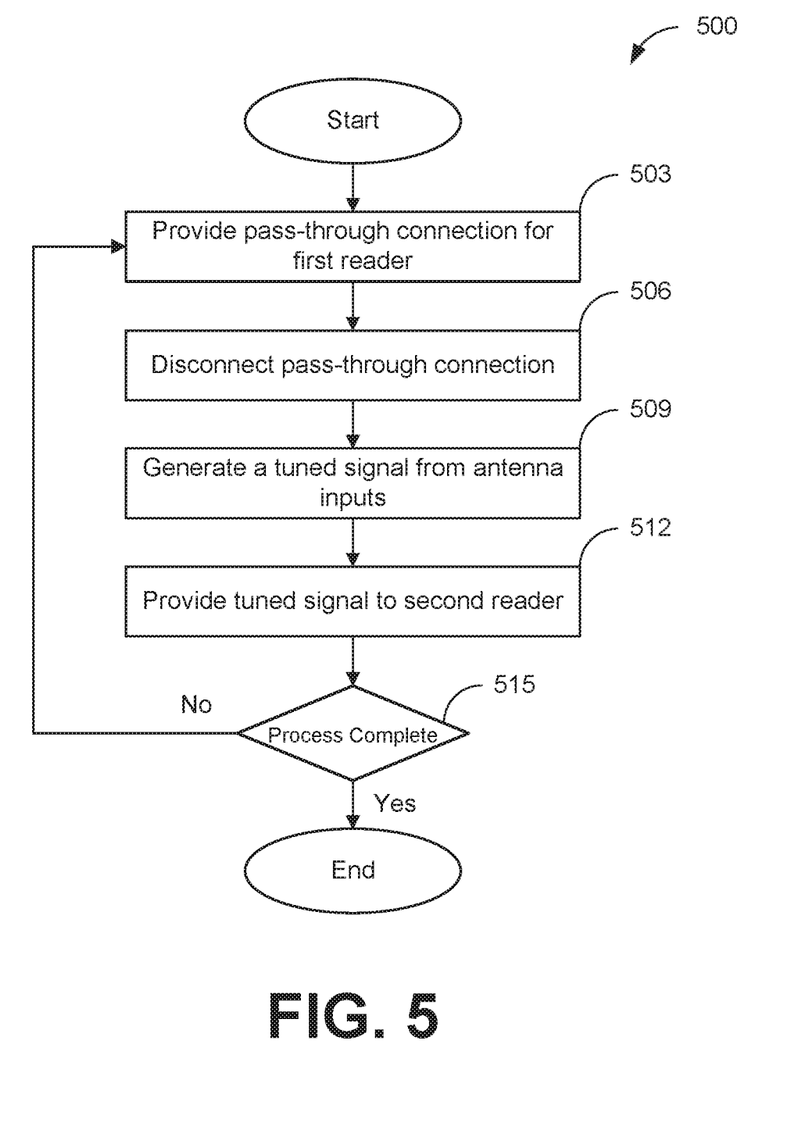
FIG. 5 illustrates an example flowchart of certain functionality implemented by portions of the switching device in the gaming environment of FIG. 1 according to various embodiments of the present disclosure.

Referring next to FIG. 5, shown is a flowchart that provides one example of a process 500 corresponding to a portion of the switching device 112 (FIG. 1) according to various embodiments. It is understood that the flowchart of FIG. 5 provides merely an example of the many different types of functional arrangements that may be employed to implement the operation of the portion of the switching device 112 as described herein. As an alternative, the flowchart of FIG. 5 may be viewed as depicting an example of elements of a method implemented in the switching device 112 according to one or more embodiments.

The process 500 can involve providing signals to two or more different RFID readers that correspond to different RFID technologies. The process 500 includes ensuring that the signal sent to each reader is in a format that the reader can process for its corresponding technology.

At box 503, the process 500 includes providing a pass-through connection for a first reader to an antenna. As an example, the switching device 112 (FIG. 1) can receive one or more wires from an antenna device 115 (FIG. 1). The switching device 112 can couple each of the wires from the antenna device to a respective wire of one or more wires connected to a reader 106. The reader 106 can read the signals from the antenna device 115 as if connected directed to the antenna device 115.

At box 506, the process 500 includes disconnecting a pass-through connection between the first reader and the antenna. For example, the switching device 112 can disconnect the pass-through connection provided in box 503. In one embodiment, the switching device 112 includes one or more transistors that switch to disconnect or stop the connections between the antenna device 115 and the reader 106. In one example, a line level of input pin coupled to the computing environment 103, the reader 106, or the reader 109 can be raised or lowered to change a state of the transistor.

At box 509, the process 500 includes generating tuned signal from the antenna inputs. As an example, the switching device 112 can tune a signal received from antenna device 115. The tuned signal can be provided to the reader 109. In some embodiments, the signal originating from the antenna device 115 is tuned based a technology corresponding to the reader 106. As such, the signal originating from the antenna device 115 can be incompatible with the technology of the reader 109. The switching device 112 can tune the signal to make it compatible with the technology of the reader 109. Once tuned, the signal can be used by the reader 109 to read RFID gaming chips of the technology from the antenna device 115. In some embodiments, the signal includes multiple wires or loops of the antenna device 115. The switching device 112 can tune the signal from each of the wires or loops.

At box 512, the process 500 includes providing the tuned signal to a second reader. The switching device 112 can provide the tuned signal from box 509 to the reader 109. The switching device 112 can cease providing the tuned signal in response to receiving a command to switch to connect with reader 106.

At box 515, the process 500 includes determining whether the process. If so, the process ends. Otherwise, the process 500 proceeds to box 503. The process may be completed during a shutdown procedure. During normal operation, the process 500 is never completes.

Figure 6:
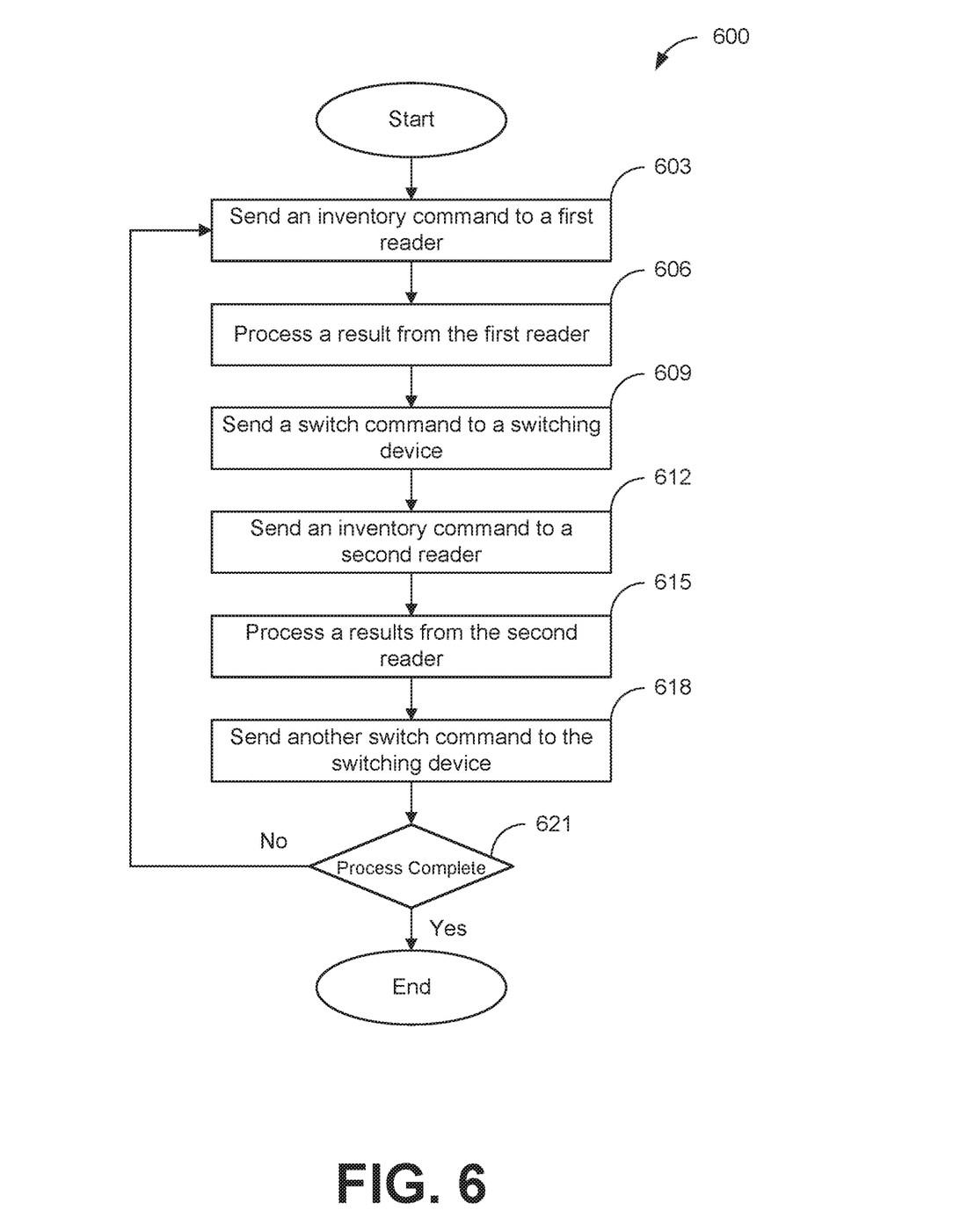
FIG. 6 illustrates an example flowchart of certain functionality implemented by portions of the inventory application in the gaming environment of FIG. 1 according to various embodiments of the present disclosure.

Referring next to FIG. 6, shown is a flowchart that provides one example of a process 600 corresponding to a portion of the inventory application 206 (FIG. 2) according to various embodiments. It is understood that the flowchart of FIG. 6 provides merely an example of the many different types of functional arrangements that may be employed to implement the operation of the portion of the inventory application 206 as described herein. As an alternative, the flowchart of FIG. 5 may be viewed as depicting an example of elements of a method implemented in the computing environment 103 (FIG. 1) according to one or more embodiments.

The process 600 can involve reading a mix of gaming chips from one or more RFID technologies from an RFID antenna. The process 600 can be used throughout a casino across a variety of tables to read gaming chips are multiple locations at each table.

At box 603, the process 600 includes sending an inventory command to a first reader. For example, the inventory application 206 (FIG. 2) can send an inventory command to the reader 106 (FIG. 1). The switching device 112 (FIG. 1) can pass-through the signal from the antenna device 115 (FIG. 1). The reader 106 can process the passed-through signal to read the gaming chips 121 (FIG. 1) corresponding to the first technology and send the reading to the inventory application 206.

At box 606, the process 600 includes processing a result from the first reader. The inventory application 206 can parse the message and extract a list of gaming chips 121 read by the reader 106. The message can include identifiers for each of the gaming chips 121. In some embodiments, the message can also include data from a programmable memory contained on each of the gaming chips 121. As an example, the gaming chips 121 can include a currency value, a history of reads, and other information stored in the programmable memory. The reader 106 can update or alter the programmable memory if necessary.

At box 609, the process 600 includes sending a switch command to a switching device. The inventory application 206 can send a switch command to the switching device 112. In some embodiments, the inventory application 206 sends the switch command through the reader 106 or the reader 109 (FIG. 1). The switching device 112 can disconnect the pass-through connection and provide a tuned signal to the reader 109.

At box 612, the process 600 includes sending an inventory command to a second reader. The inventory application 206 can send an inventory command to the reader 109. The reader 109 can process the tuned signal from the switching device 112 to read the gaming chips 121 corresponding to the second technology and send the reading to the inventory application 206.

At box 615, the process 600 includes processing a result from the second reader. Similar to box 606, the inventory application 206 can parse the message and extract a list of gaming chips 121 read by the reader 109. The format of the message may vary based on the technology of the reader 109. The message can include identifiers for each of the gaming chips 121. In some embodiments, the message can also include data from a programmable memory contained on each of the gaming chips 121. As an example, the gaming chips 121 can include a currency value, a history of reads, and other information stored in the programmable memory. The reader 109 can update or alter the programmable memory if necessary.

At box 618, the process 600 includes sending another switch command to the switching device. The inventory application 206 can send a switch command to the switching device 112. In some embodiments, the inventory application 206 sends the switch command through the reader 106 or the reader 109 (FIG. 1). The switching device 112 can disconnect the tuned signal provided to the reader 109, and provide a pass-through connection to the reader 109.

At box 621, the process 600 includes determining whether the process is complete. If so, the process ends. Otherwise, the process 600 proceeds to box 603. The process 600 may be completed during a shutdown procedure. During normal operation, the process 600 is never completes.

Figure 7:
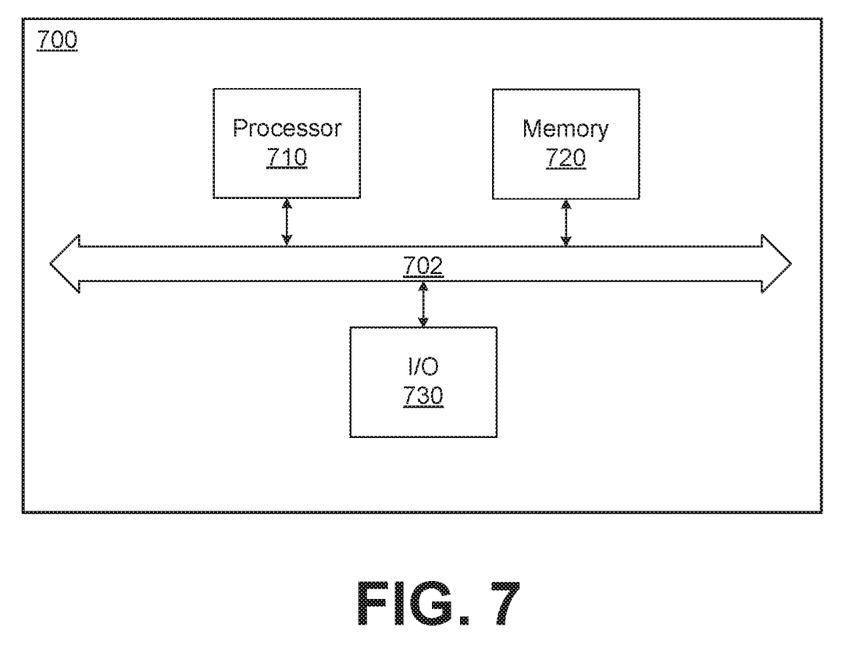
FIG. 7 is a schematic block diagram that illustrates an example computing devices employed in the gaming environment of FIG. 1 according to various embodiments.

With reference to FIG. 7, shown is a schematic block diagram of the computing device 700 according to an embodiment of the present disclosure. The computing environment 103, reader 106, reader 109, and/or switching device 112 can include one or more computing devices 700. Each computing device 700 includes at least one processor circuit, for example, having a processor 710, a memory 720, one or more inputs and outputs 730, which are coupled to a local interface 702. To this end, each computing device 700 may comprise, for example, at least one server computer or like device. The local interface 702 may comprise, for example, a data bus with an accompanying address/control bus or other bus structure as can be appreciated.

Stored in the memory 720 are both data and several components that are executable by the processor 710. In particular, stored in the memory 720 and executable by the processor 710 are the inventory application 206 and potentially other applications. Also stored in the memory 720 may be a data store 203 and other data. In addition, an operating system may be stored in the memory 720 and executable by the processor 710.

It is understood that there may be other applications that are stored in the memory 720 and are executable by the processor 710 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 720 and are executable by the processor 710. In this respect, the term "executable" means a program file that is in a form that can ultimately be run by the processor 710. Examples of executable programs may be, for example, a compiled program that can be translated into machine code in a format that can be loaded into a random access portion of the memory 720 and run by the processor 710, source code that may be expressed in proper format such as object code that is capable of being loaded into a random access portion of the memory 720 and executed by the processor 710, or source code that may be interpreted by another executable program to generate instructions in a random access portion of the memory 720 to be executed by the processor 710, etc. An executable program may be stored in any portion or component of the memory 720 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 720 is defined herein as including both volatile and nonvolatile memory and data storage components. Volatile components are those that do not retain data values upon loss of power. Nonvolatile components are those that retain data upon a loss of power. Thus, the memory 720 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 710 may represent multiple processors 710 and/or multiple processor cores and the memory 720 may represent multiple memories 720 that operate in parallel processing circuits, respectively. In such a case, the local interface 702 may be an appropriate network that facilitates communication between any two of the multiple processors 710, between any processor 710 and any of the memories 720, or between any two of the memories 720, etc. The local interface 702 may comprise additional systems designed to coordinate this communication, including, for example, performing load balancing. The processor 710 may be of electrical or of some other available construction.

Although the inventory application and logic in the reader 106, the reader 109, the switching device 112, the antenna device 115, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5 and 6 show the functionality and operation of an implementation of portions of the switching device 112 and the inventory application 206. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 710 in a computer system or other system. The machine code may be converted from the source code, etc. If embodied in hardware, each block may represent a circuit or a number of interconnected circuits to implement the specified logical function(s).

Although the flowcharts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. Further, in some embodiments, one or more of the blocks shown in FIGS. 5 and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the inventory application and logic in the reader 106, the reader 109, the switching device 112, and the antenna device 115, that comprises software or code can be embodied in any non-transitory computer-readable medium for use by or in connection with an instruction execution system such as, for example, a processor 710 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the inventory application and logic in the reader 106, the reader 109, the switching device 112, and the antenna device 115, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700 or in multiple computing devices in the same computing environment 103. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Clause 1. A system comprising: an antenna comprising a plurality of outputs; and a switching device comprising a plurality of first reader inputs, a plurality of second reader inputs, and a plurality of antenna inputs, wherein the plurality of outputs from the antenna are coupled to the plurality of antenna inputs, and the switching device is configured to at least: provide a pass-through connection between the plurality of first reader inputs and the plurality of antenna inputs; disconnect the pass-through connection between the plurality of first reader inputs and the plurality of antenna inputs; generate a tuned signal based at least in part on the plurality of antenna inputs; and provide the tuned signal to the plurality of second reader inputs.

Clause 2. The system of clause 1, wherein the plurality of outputs of the antenna individually correspond to a respective loop of the antenna.

Clause 3. The system of clause 1 or 2, wherein the switching device is further configured to at least: receive an input to configure the switching device; determine at least one parameter corresponding to tuning a signal from the plurality of antenna inputs; and store the at least one parameter, wherein the tuned signal is generated based at least in part on the at least one parameter.

Clause 4. The system of any of clauses 1-3, wherein the switching device is further configured to at least: provide a pass-through connection between the plurality of first reader inputs and the plurality of antenna inputs for a first time window; and provide the tuned signal to the plurality of second reader inputs for a second time window, the first time window and the second time window being mutually exclusive.

Clause 5. The system of any of clauses 1-4, further comprising a computing device configured to at least: read a set of first RFID enabled gaming chips via the antenna, the set of first RFID enabled gaming chips corresponding to a first RFID technology; send a command to the switching device to switch from the first RFID technology to a second RFID technology; and read a set of second RFID enabled gaming chips via the antenna, the set of second RFID enabled gaming chips corresponding to the second RFID technology.

Clause 6. The system of clause 5, further comprising: a first reader corresponding to the first RFID technology, the first reader coupled to the plurality of first reader inputs; and a second reader corresponding to the second RFID technology, the second reader coupled to the plurality of second reader inputs, wherein the switching device is further configured to at least: receive the command from the at least one computing device to switch from the first RFID technology to the second RFID technology, wherein the pass-through connection is disconnected, the tuned signal is generated, and the tuned signal is provided in response to the command.

Clause 7. The system of clause 6, wherein the set of first RFID enabled gaming chips are read via the first reader while the pass-through connection is provided between the plurality of first reader inputs and the plurality of antenna inputs, and the set of second RFID enabled gaming chips are read via the second reader while the tuned signal is provided to the plurality of second reader inputs.

Clause 8. A system comprising: an antenna; a switching device coupled to the antenna; a first reader corresponding to a first RFID technology coupled to the switching device; a second reader corresponding to a second RFID technology coupled to the switching device; and at least one computing device configured to at least: read a set of first RFID enabled gaming chips positioned on the antenna from the first reader; send a command to switch from the first reader to the second reader; and read a set of second RFID enabled gaming chips positioned on the antenna via the second reader.

Clause 9. The system of clause 8, wherein the switching device is configured to at least: send a first inventory command to the first reader; process the set of first RFID enabled gaming chips; send a second inventory command to the second reader; and process the set of second RFID enabled gaming chips.

Clause 10. The system of clause 8 or 9, wherein the first RFID technology comprises a 13.56 MHz technology and the second RFID technology comprises at least one of: phase jitter modulation (PJM) technology, an ISO 15693 technology, or a 125 KHz technology.

Clause 11. The system of any of clauses 8-10, wherein the antenna is tuned for the first reader.

Clause 12. The system of any of clauses 8-11, wherein the switching device is configured to at least: provide a pass-through connection between the antenna and the first reader; receive the command to switch from the first reader to the second reader; and in response to receiving the command: disconnect the pass-through connection between the antenna and the first reader; generate a tuned signal based at least in part on a signal of the antenna; and provide the tuned signal to the second reader.

Clause 13. The system of any of clauses 8-12, wherein the antenna comprises a plurality of loops.

Clause 14. A method comprising: reading, via at least one computing device, a set of first RFID enabled gaming chips positioned on an antenna from a first reader based at least in part on antenna signal; sending a command to switch from the first reader to a second reader; and reading, via the at least one computing device, a set of second RFID enabled gaming chips positioned on the antenna from a second reader based at least in part on tuned antenna signal, the tuned antenna signal comprising the antenna signal modified by a switching device.

Clause 15. The method of clause 14, wherein the command to switch from the first reader to the second reader is sent from the first reader to the switching device.

Clause 16. The method of clause 14 or 15, further comprising: providing, via the switching device, the antenna signal to the first reader; receiving, via the switching device, the command to switch from the first reader to the second reader; and in response to receiving the command: ceasing, via the switching device, providing the antenna signal to the first reader; generating, via the switching device, a tuned signal based at least in part on the antenna signal; and providing, via the switching device, the tuned signal to the second reader.

Clause 17. The method of any of clauses 14-16, further comprising: determining at least one parameter corresponding to tuning a signal from the antenna; and tuning, via the switching device, the signal from the antenna based at least in part on the at least one parameter.

Clause 18. The method of any of clauses 14-17, further comprising: tuning the antenna for the first reader; and subsequent to tuning the antenna for the first reader, tuning the antenna in the switching device for the second reader.

Clause 19. The method of any of clauses 14-18, wherein the first reader corresponds to a first RFID technology and the second reader corresponds to a second RFID technology.

Clause 20. The method of any of clauses 14-19, further comprising iteratively: sending a command to switch from the second reader to the first reader; reading from the first reader; sending a command to switch from the first reader to the second reader; and reading from the second reader.

Therefore, at least the following is claimed:

1. A system comprising:
    an antenna comprising a plurality of outputs; and
    a switching device comprising:
        a plurality of first reader connections;
        a plurality of second reader connections; and
        a plurality of antenna inputs coupled to the plurality of outputs from the antenna; wherein the switching device is configured to:
            provide a pass-through connection between the plurality of first reader connections and the plurality of antenna inputs;
            disconnect the pass-through connection between the plurality of first reader connections and the plurality of antenna inputs;
            generate a tuned signal based at least in part on the plurality of antenna inputs; and
            provide the tuned signal to the plurality of second reader connections.

2. The system of claim 1, wherein the plurality of outputs of the antenna each corresponds to a respective one of a plurality of loops of the antenna.

3. The system of claim 1, wherein the switching device is further configured to:
    receive an input to configure the switching device;
    in accordance with the receipt of the input to configure the switching device, determine at least one tuning parameter;
    store the at least one tuning parameter; and
    perform the generation of the tuned signal by tuning a signal corresponding at least in part to the plurality of antenna inputs, the tuning being based at least in part on the at least one tuning parameter.

4. The system of claim 1, wherein the switching device is further configured to at least:
    provide the pass-through connection between the plurality of first reader connections and the plurality of antenna inputs for a first time window; and
    provide the tuned signal to the plurality of second reader connections for a second time window, the first time window and the second time window being mutually exclusive.

5. The system of claim 1, further comprising at least one computing device, wherein the at least one computing device is configured to:
    read, via the antenna, a set of first radio frequency identification (RFID) enabled gaming chips that correspond to a first RFID technology;
    send a command to the switching device to switch from the first RFID technology to a second RFID technology; and
    read, via the antenna, a set of second RFID enabled gaming chips corresponding to the second RFID technology.

6. The system of claim 5, further comprising:
    a first reader that corresponds to the first RFID technology and that is coupled to the plurality of first reader connections; and
    a second reader that corresponds to the second RFID technology and that is coupled to the plurality of second reader connections, wherein:
        the switching device is further configured to receive the command from the at least one computing device to switch from the first RFID technology to the second RFID technology; and
        the pass-through connection is disconnected, the tuned signal is generated, and the tuned signal is provided in response to the command.

7. The system of claim 6, wherein the reading of the set of first RFID enabled gaming chips is via the first reader while the pass-through connection is provided between the plurality of first reader connections and the plurality of antenna inputs, and the reading of the set of second RFID enabled gaming chips is via the second reader while the tuned signal is provided to the plurality of second reader connections.

8. A system comprising:
    an antenna;
    a switching device coupled to the antenna;
    a first reader corresponding to a first radio frequency identification (RFID) technology coupled to the switching device;
    a second reader corresponding to a second RFID technology coupled to the switching device; and
    at least one computing device configured to:
        read a set of first RFID enabled gaming chips positioned on the antenna using the first reader;
        send a command to switch from the first reader to the second reader; and
        read a set of second RFID enabled gaming chips positioned on the antenna using the second reader.

9. The system of claim 8, wherein the switching device is configured to at least:
    send a first inventory command to the first reader;
    process the set of first RFID enabled gaming chips;
    send a second inventory command to the second reader; and
    process the set of second RFID enabled gaming chips.

10. The system of claim 8, wherein the first RFID technology comprises a 13.56 MHz technology and the second RFID technology comprises at least one of: phase jitter modulation (NM) technology, an ISO 15693 technology, or a 125 KHz technology.

11. The system of claim 8, wherein the antenna is tuned for the first reader.

12. The system of claim 8, wherein the switching device is configured to:
- provide a pass-through connection between the antenna and the first reader;
- receive the command to switch from the first reader to the second reader; and
- in response to receiving the command:
  - disconnect the pass-through connection between the antenna and the first reader;
  - generate a tuned signal based at least in part on a signal of the antenna; and
  - provide the tuned signal to the second reader.

13. The system of claim 8, wherein the antenna comprises a plurality of loops.

\* \* \* \* \*

UNITED STATES PATENT AND TRADEMARK OFFICE
CERTIFICATE OF CORRECTION

PATENT NO. : 11,714,976 B2
APPLICATION NO. : 17/051864
DATED : August 1, 2023
INVENTOR(S) : Gelinotte et al.

It is certified that error appears in the above-identified patent and that said Letters Patent is hereby corrected as shown below:

In the Claims

Claim 10, Column 17, Line 4: please replace "(NM)" with --(PJM)--.

Signed and Sealed this
Nineteenth Day of September, 2023

Katherine Kelly Vidal
*Director of the United States Patent and Trademark Office*